United States Patent Office 2,982,719
Patented May 2, 1961

2,982,719

TREATMENT OF HYDROUS OXIDES

William I. Gilbert, Oakmont, William A. Pardee, Fox Chapel, and Charles W. Montgomery, Oakmont, Pa., assignors to Gulf Research & Development Company, Pittsburgh, Pa., a corporation of Delaware No Drawing. Filed Sept. 30, 1955, Ser. No. 537,899

15 Claims. (Cl. 208—120)

This application, which is a continuation-in-part of application Serial No. 222,522 of William I. Gilbert, William A. Pardee and Charles W. Montgomery, filed April 23, 1951, now abandoned, and entitled Treatment of Silica-Alumina Composite and Catalytic Process Employing Same, relates to a process for modifying hydrous inorganic oxides and especially to altering the pore structure of such hydrous oxides to control their surface area and, when the hydrous oxides are catalysts, their catalytic activity. The invention also relates to a catalytic cracking process in which a high molecular weight hydrocarbon such as a petroleum oil is contacted with a hydrous oxide composition which has been treated to alter its pore structure, under catalytic cracking conditions to form lower molecular weight hydrocarbons.

Hydrous inorganic oxide compositions of the type treated according to this invention have a porous structure resulting in a high surface area per unit weight of the hydrous oxide. The hydrous oxides are widely used in adsorption and catalytic processes in which the large surface area ordinarily increases the effectiveness of the hydrous oxides as adsorbent or catalytic materials; however, in some instances it is desirable to reduce the surface area of the hydrous oxides to increase the efficiency with which they may be used. Examples of typical porous, inorganic, hydrous oxides are the hydrous oxides of silica and alumina. The hydrous oxides are widely used alone, in mixtures with other hydrous oxides, or either singly or together in combination with other oxides of metals.

An extremely important use of hydrous inorganic oxides is as catalysts in the refining of petroleum. Composites of silica and alumina, in which the silica generally constitutes a major proportion of the composite, are especially important catalysts for cracking high boiling hydrocarbons to more volatile fractions. Silica-alumina catalysts often have an excessive initial activity which causes overcracking with the formation of large amounts of gases and coke, and a consequent loss in yield of liquid hydrocarbon products, during the initial use of the catalyst. Upon continued use of the silica-alumina cracking catalysts, their activity is reduced and the amount of gas and coke produced in the cracking process is reduced to increase the ratio of gasoline to gas and coke in the products of the cracking process.

This invention resides in a method of altering the pore structure of hydrous inorganic oxides to reduce their surface area by treating the hydrous oxides with steam at an elevated temperature and pressure. The time of the treatment with steam and the temperature and pressure employed are interdependent and must be correlated to obtain the desired reduction in surface area. The reduction in surface area is accomplished without appreciable change in density or rigidity of the hydrous oxide. This invention is especially valuable in controlling the activity of hydrous oxide cracking catalysts to give a more favorable product distribution, and includes the cracking of petroleum hydrocarbons in the presence of silica-alumina cracking catalysts, the initial activity of which has been reduced by steaming at elevated pressures.

The hydrous oxides are porous inorganic oxides of natural or synthetic origin containing some water, which may be held in the structure of the oxide or strongly adsorbed in a very thin film in the pores, but are substantially dry. The hydrous oxides feel dry and have a dry appearance. Porous hydrous oxides suitable for use in this invention are often prepared from gels or gelatinous precipitates of inorganic oxides. Water is removed from the gels and gelatinous precipitates by oven drying, for example, beyond maximum shrinkage to form a substantially dry, rigid, porous composition, the pores of which are substantially free of water. The hydrous oxides can be dried at an elevated temperature or calcined prior to the steaming, but such high temperature drying is not an absolute necessity. By calcining is meant heating to a temperature of about 700° to 1300° F., preferably about 1000° F.

The hydrous oxides described in the preceding paragraph constitute a major proportion of the compositions steamed at high pressures by the method of this invention. The compositions may be a single hydrous oxide or a mixture of two or more hydrous oxides, or may consist of one or more hydrous oxides plus one or more components other than hydrous oxides. For simplicity in description of the invention, the compositions treated by this invention are designated by the term "hydrous oxides." The most important hydrous oxides which may be treated to modify their pore structure and decrease their surface area by this invention are those containing hydrated silica as a major component. The hydrated silica may be in combination or physical mixtures with other hydrous oxides. Composites of silica and alumina are important because of their value as catalysts for cracking petroleum hydrocarbons. The treatment of silica-alumina cracking catalysts to modify their pore structure to reduce their surface area and catalytic activity is an especially important feature of this invention. The silica-alumina composites may contain other components such as oxide of one or more of chromium, nickel, molybdenum, tungsten, vanadium, magnesium, calcium, zirconium, boron, thorium and cobalt.

Hydrous oxides can be manufactured by a variety of methods. For example, one such method for the preparation of silica-alumina composites comprises first preparing a silica hydrogel by any suitable procedure, an example of which is reacting an alkali metal silicate such as sodium silicate with an acidic material such as hydrochloric acid, washing the resulting gel substantially free of alkali metal, precipitating alumina in the form of a hydrated alumina gel, and then combining the silica gel with the alumina gel without drying the gels. The combined gels are then dried, pelleted, if pellets are desired, and calcined in air at a temperature of the order of 700° to 1300° F., ordinarily about 1000° F.

Another method of preparing these siliceous composites comprises co-precipitating silica and alumina in the form of either a gel or gelatinous precipitate. Any alkali metals present in the co-precipitated gel as initially formed can be removed from the wet gel, which is dried, and then calcined under similar conditions to those indicated above. Alternatively, the gel containing an alkali metal can be dried and the alkali metal then removed by base-exchange, for example, with a suitable ammonium salt. The resulting product is dried again and then calcined to fix its physical and chemical properties. Still another method for the manufacture of these composites is to precipitate the silica hydrogel and then form the silica-alumina hydrogen by precipitating a gel or gelatinous precipitate of alumina in the presence of the silica hydrogel; followed by the drying and calcining of the combined gel.

When composites of silica and alumina of the type described are employed for the catalytic cracking of high molecular weight hydrocarbons, it is preferable that the silica be present in a predominant amount, preferably of the order of about 80 to 95 percent by weight and especially about 85 to 90 percent by weight.

This invention is also effective in modifying hydrous oxides derived from natural siliceous composites such as bentonite clays.

The time, temperature and pressure used for treatment of the hydrous oxides are interdependent and must be correlated to control the pore size of the treated hydrous oxides. In general, an increase in any of the time, temperature or pressure will cause a more drastic alteration of the pore structure as shown by greater reduction in the surface area of the treated oxide. The temperature of treatment is preferably in the range from about 307° to about 650° F. A pressure of about 75 to 1500 pounds per square inch is employed and the time of the steaming treatment ranges up to 9 hours or more, and is preferably in the range of about 10 minutes to 2 hours. Steaming periods longer than 2 hours result in increased alteration of the pore structure, but the rate of alteration decreases as the time of the steam treatment increases beyond 2 hours. Periods shorter than 10 minutes reduce the amount of modification of the pore structure, but can be used. Control of the extent of alteration of the pore structure is more difficult when conditions of temperature and pressure requiring treating periods of less than 10 minutes are used. In batch treating processes, the hydrous oxide may be merely heated to the desired temperature in the presence of steam and the pressure immediately released when the desired temperature is reached.

The time, temperature and pressure of the steam treatment are mutually interdependent. The specific conditions of time, pressure and temperature of steaming used will depend upon the initial surface area of the hydrous oxide, the desired final surface area of the hydrous oxide and the particular hydrous oxide treated; and those variables must be correlated to produce a hydrous oxide having the desired pore structure.

Either saturated or superheated steam within the limits of temperature and pressure set forth above can be used in the steaming to modify the pore structure, as shown by reduction of the surface area, of the hydrous oxides. In a preferred embodiment of the invention, substantially saturated steam is used to treat the hydrous oxide. A high rate of modification of the pore structure is obtained with saturated steam within the indicated pressure range. However, when the steaming is accomplished at high temperatures, for example, near the upper limit of the preferred temperature range of 307° to 650° F., it is advantageous to use superheated steam to avoid the difficulties and expensive apparatus demanded by very high pressure steam. Even when using highly superheated steam, it is important that the pressure of the steam be above about 75 pounds per square inch to obtain the advantages of this invention.

The treatment of the hydrous oxides with steam in accordance with the process of our invention can be performed by various procedures. The hydrous oxide can be treated with a moving atmosphere of steam at the desired temperature and pressure. This can be accomplished by heating the catalyst to the desired temperature in a catalyst treatment bomb and then passing steam at the desired temperature and pressure from a steam generator into the catalyst treatment bomb for the requisite time. After this time has elapsed, the steam is released and the catalyst can be calcined.

While the above constitutes the preferred procedure, satisfactory results can be obtained through the use of a single treatment bomb without an auxiliary steam generator. In accordance with this procedure, the composite is placed in a closed pressure vessel containing water and the vessel is heated to a predetermined steaming temperature. The hydrous oxide is preferably suitably supported above the water level in the bomb. After the bomb has reached the desired temperature and has been maintained at the temperature for the desired period, the bomb is opened and the pressure reduced to atmospheric pressure. This procedure suffers from the difficulty of not having a constant steam pressure and temperature, and of not offering precise control of the steam treatment. Accordingly, it is preferred that the steaming treatment should be made by means of the former procedure employing an auxiliary steam generator in order that the time of treatment with steam at the desired temperature can be regulated.

The surface area of a hydrous oxide can be reduced by the high pressure steaming to 10 percent or even less of the surface area of the unsteamed material. The following examples illustrate the steam treatment of several hydrous oxides to reduce their surface area by the method of this invention.

EXAMPLE I

A commercial silica gel was calcined at 1000° F. The surface area of the calcined silica gel was measured by the method described in a publication of S. Brunauer, P. H. Emmett and E. Teller, J. Am. Chem. Soc. 60, 309 (1938). (This method for the determination of the surface area shall hereinafter be identified as the B.E.T. method.)

EXAMPLE II

A sample of the calcined silica gel of Example I was placed in a bomb containing water. The silica gel was supported on a wire screen above the level of the water. The bomb was heated to a temperature of about 540° F. in 4 hours and 25 minutes and held at that temperature for 2 hours. The temperature was above 307° F. for approximately 5 hours and 45 minutes during the run. The pressure on the bomb increased to a maximum of about 1000 pounds per square inch. The steamed sample of silica gel was calcined at 1050° F. for 4 hours and a surface area determination using the B.E.T. method was made.

EXAMPLE III

A sample of a commercial activated alumina manufactured by The Harshaw Chemical Company was calcined at 1000° F. The surface area of the calcined alumina was measured by the B.E.T. method.

EXAMPLE IV

A sample of the calcined activated alumina of Example III was treated with steam and calcined in the manner described for the silica gel of Example II. The surface area of the treated alumina was measured by the B.E.T. method.

EXAMPLE V

A sample of a Magnesol cracking catalyst, a catalyst prepared by base-exchanging a calcium silicate with a solution of a magnesium salt to replace calcium with magnesium was calcined at 1000° F. The surface area of the calcined Magnesol was measured by the B.E.T. method.

EXAMPLE VI

A sample of the calcined Magnesol was steamed and calcined at the conditions described for treating silica gel in Example II and the surface area was measured by the B.E.T. method.

EXAMPLE VII

The surface area of a 45 A.I. Houdry cracking catalyst, a co-precipitated silica-alumina cracking actalyst containing about 85 percent silica and 15 percent alumina was measured by the B.E.T. method.

EXAMPLE VIII

A sample of the 45 A.I. Houdry catalyst of Example VII was placed in a bomb containing water. The catalyst was supported above the surface of the water. The bomb was heated in 4 hours to a temperature of about 650° F. and a pressure of about 520 pounds per square inch, after which it was shut down overnight. On the following day, water was added and the bomb was heated to a temperature of about 500° F. and a pressure of about 750 pounds per square inch for 3 hours and then heated for an additional 4 hours during which the temperature rose gradually to about 540° F. and the pressure to about 1000 pounds per square inch. The bomb was allowed to cool and the steamed catalyst was calcined at 1050° F. for a period of 4 hours. The surface area of the catalyst was determined by the B.E.T. method employed in the other examples.

EXAMPLE IX

A hydrous alumina on silica gel was prepared by the impregnation of silica gel with aluminum nitrate followed by the decomposition of the aluminum nitrate to form a composite of alumina and silica. The composite contained 5.8 percent $Al_2O_3$. The surface area was measured by the B.E.T. method.

EXAMPLE X

A sample of the alumina on silica composite of Example IX was steamed and calcined in the manner described for the treatment of the 45 A.I. Houdry catalyst of Example VIII.

EXAMPLE XI

Another composite of alumina on silica prepared by impregnating a silica gel with aluminum nitrate followed by decomposition of the aluminum nitrate to form alumina, and washing, drying and calcining at 1000° F. The resultant composite contained 3.5 percent $Al_2O_3$. The surface area of the composite was measured by the B.E.T. method.

EXAMPLE XII

A sample of the composite of Example XI was steamed and calcined at the conditions described for the treatment of silica gel in Example II after which the surface area was measured by the B.E.T. method.

EXAMPLE XIII

A sample of a synthetic silica-alumina catalyst prepared by the co-precipitation of a gelatinous precipitate of silica and alumina and washed substantially free of alkali metal salts was calcined for 10 hours at 1000° F. The catalyst consisted of approximately 85 percent silica and 15 percent alumina. The surface area was measured by the B.E.T. method.

EXAMPLE XIV

A sample of the calcined synthetic catalyst of Example XIII was placed in a basket after the calcining, and the basket was suspended in a bomb which was then evacuated. Steam was introduced into the bomb until a pressure of 75 p.s.i.g. was obtained. The steam in the bomb was slightly superheated, the temperature being 354° F. The bomb was placed in a furnace in which the temperature was maintained at a constant level. The pressure within the bomb was controlled at 75 p.s.i.g. by the addition or removal of steam from the bomb, as required. The treatment of the catalyst with steam under pressure was continued for a period of two hours, after which the catalyst was removed from the bomb. The surface area was measured by the B.E.T. method.

EXAMPLE XV

A commercial cracking catalyst manufactured by the Filtrol company by the acid treatment of a montmorillonite clay was calcined at 1000° F. The surface area was measured by the B.E.T. method.

EXAMPLE XVI

A sample of the cracking catalyst of Example XV was placed in a bomb. Water was added to the bomb and the bomb heated to a temperature of 450° F. in about 4 hours. The maximum pressure reached was 405 p.s.i.g. Immediately after the temperature reached 450° F. the pressure on the bomb was released and the bomb allowed to cool. The surface area of the catalyst was determined by the B.E.T. method.

The surface areas of the untreated and steamed hydrous oxides of the above examples are set forth in the following Table I.

Table I

| Example No. | Hydrous Oxide | Approx. Time Above 307° F. and 75 p.s.i., Hrs. | Steaming Temp., °F.[1] | Steaming Pressure, p.s.i.g.[2] | Surface Area, sq. m./gm. |
|---|---|---|---|---|---|
| I | $SiO_2$ Gel | | | | 720 |
| II | do | 6 | 540 | 1000 | 37 |
| III | Alumina | | | | 87 |
| IV | do | 6 | 540 | 1000 | 78 |
| V | Magnesol | | | | 379 |
| VI | do | 6 | 540 | 1000 | 281 |
| VII | 45 A.I. Houdry | | | | 294 |
| VIII | do | 9 | 540 | 1000 | 45 |
| IX | Alumina on Silica | | | | 126 |
| X | do | 9 | 540 | 1000 | 40 |
| XI | do | | | | 442 |
| XII | do | 6 | 540 | 1000 | 17 |
| XIII | Silica-Alumina | | | | 288 |
| XIV | do | [3]2 | 354 | 75 | 221 |
| XV | Activated Montmorillonite | | | | 337 |
| XVI | do | 2 | 450 | 405 | 274 |

[1] Maximum temperature reached during batch steaming.
[2] Maximum pressure reached during batch steaming.
[3] Hours at 354° F.

As illustrated in Table I, it is possible to reduce the surface area of hydrous oxides drastically by treating them with steam at elevated temperatures and pressures. In some instances, notably in the treatment of silica gel or impregnated silica gels, the surface area is reduced to as little as about 4 percent of the surface area of the unsteamed hydrous oxide. Similar results have been obtained in the treatment of other hydrous oxides as well as other mixtures of hydrous oxides. For example, composites of nickel oxide or boric oxide on Houdry silica-alumina cracking catalysts have been treated according to this invention. Similarly, Magnesol impregnated with alumina and composites of silica, alumina, and cobalt oxide can be modified by the process of this invention. The form of the hydrous oxide is not important. Hydrous oxides in bead form, such as hydrous oxides of silica and alumina prepared by the co-gelation of silica and alumina in an immiscible medium, as well as hydrous oxides in powder or lump form can be steamed by the method of this invention to modify their pore structure, as shown by a reduction in the surface area.

The process of this invention is of value in commercial processes for the catalytic cracking of high molecular weight hydrocarbons to increase the yield of more volatile liquid products. As indicated above, the initial activity of cracking catalysts is often higher than is desirable and results in a low initial yield of the desired liquid products caused by the production of excessive amounts of gas and coke. The activity of silica-alumina cracking catalysts, or composites of silica and alumina with other metal oxides such as magnesium, zirconium, titanium, boria, thoria and tungsten oxide, can be reduced by this invention to improve the ratio of gasoline to gas plus coke in the cracked products.

When used for the catalytic cracking of high molecular weight hydrocarbons such as higher boiling oils like gas oil, fuel oil and heavier fractions of petroleum, to gasoline and other low boiling liquid gaseous hydrocarbons with the concomitant deposition of coke upon the composite catalyst, the oil is passed in contact with the catalyst at a temperature of 700° to about 1100° F., preferably of 800° to 1000° F., at about atmospheric or slightly higher pressures ranging up to about 50 to 75 pounds per square inch. Typical commercial catalytic cracking processes include fixed bed processes, in which the catalyst in the form of small pellets or granules, is retained in a stationary bed; moving bed processes wherein the catalyst is caused to move downwardly through the reactor in a continuous bed, and fluid processes wherein the catalyst in the form of fine particles is dispersed in a turbulently agitated state to form a fluidized catalyst bed. Each process requires the regeneration of the catalyst by burning off the coke, this regeneration being accomplished in situ in fixed bed processes and in a separate regenerator in moving bed and fluid processes.

The following examples illustrate the modification of hydrous oxide cracking catalysts by the method of this invention.

EXAMPLE XVII

A commercial synthetic silica-alumina composite cracking catalyst was treated in accordance with the process of our invention. This composite had been prepared by co-precipitating silica and alumina gels, or gelatinous precipitates, by reacting sodium silicate in the form of a commercial water-glass solution, sodium aluminate, and a suitable inorganic acid such as sulfuric acid, drying the resultant composite gel, base-exchanging the dried composite gel with an ammonium salt such as ammonium chloride to remove sodium, and then pelleting, drying and calcining the composite at a temperature of about 1000° F. to produce final calcined pellets in the form of one-eighth inch by one-eighth inch cylinders. The composite contained about 12 percent by weight of alumina.

Portions of this composite were subjected to treatment with substantially saturated steam for varying periods of time, namely 20 minutes, 30 minutes, 60 minutes, and 90 minutes. The catalytic cracking activity of each of these portions as well as of the untreated composite was then determined by passing a Mid-Continent straight run gas oil having an initial boiling point of 470° F. and an end point of 650° F. in contact with the composite in a fixed bed at a temperature of about 845° F., a liquid hourly space velocity of 1.0, and a throughput of one volume of gas oil per volume of composite catalyst. The gasoline yield was determined as that part of the synthetic product collected at 55° F. that was taken overhead at 370° F. from a low efficiency fractionating column. The conditions for the steam treatment of the composites and the results obtained are given in the following Table II.

Table II

| Composite | XVIIa | XVIIb | XVIIc | XVIId | XVIIe |
|---|---|---|---|---|---|
| Steaming Temp., ° F. | none | 450 | 450 | 450 | 500 |
| Steaming Pres., p.s.i.g. | none | 418 | 420 | 395 | 690 |
| Time, minutes | none | 30 | 60 | 90 | 20 |
| Gasoline yield, Wt. Percent | 27.2 | 22.9 | 21.1 | 20.6 | 19.4 |
| Gascoke Yield, Wt. Percent | 8.9 | 6.7 | 5.7 | 5.1 | 5.1 |
| Coke Yield, Wt. Percent | 1.5 | 1.2 | 0.8 | 0.7 | 0.7 |
| Gasoline: Gascoke ratio | 3.05 | 3.42 | 3.70 | 4.03 | 3.81 |

It will be seen from the results given in the table that pressurized steaming under the conditions stated produced a reduction in the cracking activity of the composite and a concomitant improvement in product distribution as indicated by the gasoline to gascoke (gas+coke) ratios. Also, from an examination of the data for Composites XVIIa and XVIIe it is apparent that at elevated pressures both the reduction in composite cracking activity and improvement in product distribution are accelerated. It will be understood that the pressure and time of treatment are interrelated factors and that at the lower pressures the time required to obtain the advantages of the invention is ordinarily longer than is necessary at the higher pressures.

EXAMPLE XVIII

Another commercial synthetic silica-alumina cracking composite similar to that employed in Example XVII but having a somewhat different cracking activity was treated in accordance with the process of our invention. Different portions of this composite were subject to varying steam treatments, e.g., Composites XVIIIb through XVIIIg were subjected to treatments with substantially saturated steam, and Composite XVIIIh to treatment with superheated steam. The cracking activities of these variously treated composites were then determined as before. The conditions for the steam treatment of the composites and the results obtained are given in Table III.

Table III

| Composite | XVIIIa | XVIIIb | XVIIIc | XVIIId | XVIIIe | XVIIIf | XVIIIg | XVIIIh |
|---|---|---|---|---|---|---|---|---|
| Steaming temperature, ° F. | none | 400 | 400 | 400 | 450 | 450 | 450 | 450 |
| Steaming pressure, p.s.i.g. | none | 222 | 225 | 244 | 408 | 411 | 408 | 225 |
| Time, minutes | none | 60 | 60 | 120 | 20 | 40 | 60 | 60 |
| Gasoline yield, Wt. Percent | 31.3 | 25.7 | 24.5 | 23.4 | 23.5 | 22.0 | 21.0 | 25.1 |
| Gascoke yield, Wt. Percent | 15.8 | 11.3 | 9.6 | 7.5 | 8.0 | 6.3 | 6.3 | 11.4 |
| Coke Yield, Wt. Percent | 3.0 | 1.8 | 1.3 | 1.0 | 1.2 | 0.9 | 1.0 | 1.8 |
| Gasoline: gascoke ratio | 1.98 | 2.27 | 2.55 | 3.12 | 2.94 | 3.49 | 3.33 | 2.20 |
| Surface Area, Sq. m./gm. | | 164 | | 124 | 87 | | 98 | 179 |

EXAMPLE XIX

A co-precipitated silica-alumina cracking catalyst was treated in a batch steaming method by placing a commercial silica-alumina cracking catalyst of slightly different activity than the catalysts in Examples XVII and XVIII in a stainless steel basket directly above a beaker of water in an autoclave. Heat was applied to the autoclave at a constant rate for each sample and the temperature was allowed to rise until the desired temperature was reached. The pressure developed in the autoclave during the treatment of each sample was about 30 pounds per square inch lower than the pressure of saturated steam at the recorded temperature. After the temperature reached the desired value, the pressure was reduced immediately and the catalyst was removed from the autoclave and placed in an electric muffle furnace where it was heated at about 1400° F. for about 6 hours and held at this temperature for about 10 hours. The procedure was repeated for different portions of the cracking catalyst at the different temperatures set forth in the following Table IV. The cracking activities of the differently treated catalyst samples were determined by the method described in XVII and the surface areas were then determined by the B.E.T. method. The conditions for the steam treatment and the results obtained are given in Table IV. The bulk density was determined by weighing a known volume of the catalyst which had been packed to reduce the voids to a constant minimum value.

*Table IV*

| Composite | XIXa | XIXb | XIXc | XIXd | XIXe |
|---|---|---|---|---|---|
| Steaming Temp., ° F | none | 500 | 450 | 400 | 350 |
| Pressure, Approx., p.s.i.a | none | 650 | 395 | 225 | 110 |
| Gasoline yield, Wt. percent | 32.3 | 14.8 | 21.0 | 23.9 | 27.4 |
| Gascoke Yield, Wt. Percent | 15.2 | 3.7 | 6.5 | 8.0 | 10.2 |
| Gasoline/Gascoke ratio | 2.1 | 4.0 | 3.2 | 3.0 | 2.7 |
| Surface Area, Sq. m./gm | 303 | 55 | 132 | 171 | 223 |
| Bulk Density, gm./cc | .57 | .64 | .63 | .63 | .61 |

It will be seen from the tables that, as before, pressurized steaming of the composite produces a reduction in cracking activity and surface area and a concomitant improvement in product distribution. The effect of the steam treatment pressure is seen from a comparison of the results secured with catalyst composite portions XVIIIg and XVIIIh. The temperature and time of steam treatment for both of these composites were identical. However, in the former where the composite was subjected to steam treatment with saturated steam, both the cracking activity reduction and product distribution improvement were greater than in Composite XVIIIh in which superheated steam was employed. However, the latter composite was superior in product distribution to the untreated composite and closely approximated composites that had been treated with saturated steam of equivalent pressure for an identical steaming period (Composites XVIIIb and XVIIIc). The desirability of using saturated steam rather than superheated steam is readily apparent from these results, since the maximum steam pressure at a given temperature can thus be used. However, as shown above, superheated steam may also be used, and the use of such steam is within the scope of our invention.

Steaming hydrous oxides by the process of this invention causes very little change in their density. As shown in Table IV the steaming caused an approximately 10 percent increase in the bulk density of the silica-alumina catalyst.

It is to be understood that results similar to those given in the foregoing examples can be obtained by subjecting other hydrous oxides previously described at a temperature within the range of between about 307° to 650° F. to the action of steam exerting a pressure of between about 75 to 1500 pounds per square inch absolute. Our work has shown that through steam treatment of these composites within these temperature and pressure ranges a more rapid improvement in catalyst selectivity can be achieved than is secured by high-temperature low-pressure steaming methods. Thus a commercial synthetic silica-alumina cracking composite similar to that employed in Examples XVII and XVIII but having a somewhat different cracking activity, was deactivated with steam at 1100° F. and at atmospheric pressure. The cracking activity of this composite was determined at various intervals during the course of the steaming treatment. The results obtained are given in Table V.

*Table V*

| Steaming Time (Hours) | Gasoline Yield (Wt. Percent) | Gas-Coke Yield (Wt. Percent) |
|---|---|---|
| 0 | 30.9 | 12.8 |
| 38 | 26.9 | 9.6 |
| 79.5 | 24.8 | 9.0 |
| 205.5 | 23.5 | 8.4 |
| 289.5 | 21.3 | 6.6 |

It will be seen from the results given in the above table, that deactivation is very slow at atmospheric pressure despite the high temperature. After 205.5 hours of steaming treatment, the loss in catalyst activity was only approximately 27 percent. This is to be contrasted with the 32 percent and 40 percent decrease in catalyst activity exhibited in Composites XVIIe of Table II and XVIIIf of Table III, achieved by steam treating for 20 and 40 minutes, respectively, with saturated steam at 500° and 450° F.

The steaming treatment process of our invention may be applied to both calcined hydrous oxides and hydrous oxides that have not undergone prior calcination treatment. In addition, the process of our invention includes both the modification in which the hydrous oxide that has been subjected to steam treatment is subsequently calcined, and the modification in which the hydrous oxide composite does not undergo subsequent calcination after the steam treatment.

We have disclosed a wide variety of steam treatment conditions employing varying steaming times, pressures and temperatures. Especially good control of the characteristics of silica-alumina cracking catalysts can be achieved through a steam treatment employing saturated steam at a temperature of between about 400° to 500° F. for between about 10 minutes and 2 hours, with the longer steaming times within this range being employed at the lower temperatures.

We claim:

1. A method for modifying the pore structure of a porous hydrous oxide composition without effecting appreciable change in the density thereof, comprising contacting a substantially dry porous hydrous oxide composition with water vapor at a temperature in the range of 400° to 500° F. and a pressure between about 100 and about 1500 pounds per square inch for a period of at least one hour.

2. A method for treating an inorganic oxide gel previously dried to a stage beyond that at which maximum shrinkage occurs to reduce the surface area thereof, which comprises bringing said gel into contact with water vapor at a temperature in the range of about 307° to about 650° F. and a pressure in the range of about 75 to 1500 pounds per square inch for a period of time sufficient to effect the desired reduction in surface area.

3. A process for modifying the catalytic activity of a silica-alumina cracking catalyst comprising subjecting the catalyst to steam at a temperature in the range of about 307° to 650° F. and a pressure in the range of about 75 to 1500 pounds per square inch for a period sufficient to effect the desired modification of the catalytic activity.

4. A process as set forth in claim 3 in which the steam is substantially saturated steam.

5. A process as set forth in claim 3 in which the silica-alumina composite is a synthetic composite.

6. A process as set forth in claim 3 in which the period of steaming is between about 10 minutes and 9 hours.

7. A process for reducing the surface area of a dried hydrous inorganic oxide comprising subjecting the hydrous inorganic oxide to steam at a temperature in the range of about 307° to about 650° F. at a pressure of about 75 to 1500 pounds per square inch for a period of about ten minutes to 9 hours.

8. A process as set forth in claim 7 in which the hydrous oxide is principally an oxide selected from the group consisting of silica and alumina.

9. A process for reducing the surface area of a composite of silica and alumina comprising contacting the composite with substantially saturated steam at a temperature of 400 to 500° F. and a pressure of about 247 to 680 p.s.i. for a period of about ten minutes to about 2 hours.

10. A process for the conversion of a high molecular weight hydrocarbon under catalytic cracking conditions with a silica-alumina cracking catalyst treated by subjecting the catalyst to steam at a temperature in the range of about 307 to 650° F. and a pressure in the range of about 75 to 1500 p.s.i. to convert said high molecular weight hydrocarbons to lower molecular weight hydrocarbons.

11. A process for the conversion of high molecular weight hydrocarbons comprising passing the high molecular weight hydrocarbons at cracking conditions in contact with a synthetic silica-alumina cracking catalyst which has been steamed at a temperature of about 307° F. to about 650° F. and a pressure of about 75 to about 1500 pounds per square inch for a period of about 10 minutes to about 9 hours.

12. A process for the conversion of a high molecular weight hydrocarbon under catalytic cracking conditions with a silica-alumina composite treated by contacting the composite with substantially saturated steam at a temperature of 400 to 500° F. and a pressure of about 247 to 680 p.s.i. for a period of about 10 minutes to about 2 hours to convert said high molecular weight hydrocarbons to lower molecular weight hydrocarbons.

13. A hydrocarbon conversion process which comprises contacting a hydrocarbon charge with a porous hydrous oxide cracking composition which has undergone pretreatment with water vapor, while in an initially dry state, at a temperature between about 307° F. and about 650° F. and a pressure between about 75 and about 1500 pounds per square inch so as to effect a substantial decrease in the surface area of said composition without effecting appreciable change in the density thereof.

14. A process which comprises catalytically cracking a hydrocarbon charge stock heavier than gasoline in the presence of a porous hydrous oxide cracking catalyst which has been treated, in an initially dry state, with water vapor, without appreciable change in density at a temperature between about 307° F. and about 650° F. and a pressure between about 75 and about 1500 pounds per square inch for a period of between about 10 minutes and about 9 hours.

15. A process for the conversion of a high molecular weight hydrocarbon under catalytic cracking conditions with a silica-alumina composite which has been treated, in an initially dry state with water vapor, without appreciable change in density at a temperature in the range of 307° F. to 650° F. and a pressure in the range of 75 to 1500 pounds per square inch for a period of between about 10 minutes and about 9 hours.

References Cited in the file of this patent

UNITED STATES PATENTS

| | | |
|---|---|---|
| 2,375,757 | Bates | May 15, 1945 |
| 2,698,305 | Plank et al. | Dec. 28, 1954 |

OTHER REFERENCES

Shabaker: Houdry Pioneer, vol. 3, No. 1, May 1948, 8 pages, "Steam Aging of Cracking Catalysts."